Patented Jan. 21, 1936

2,028,292

UNITED STATES PATENT OFFICE 2,028,292

METHOD OF MAKING TITANIUM DIOXIDE

Reginald Hill Monk and Archibald Stewart Ross, Montreal, Quebec, Canada, assignors to American Zinc, Lead & Smelting Company, St. Louis, Mo., a corporation of Maine No Drawing. Application July 12, 1934, Serial No. 734,870

38 Claims. (Cl. 23—202)

This invention relates to an improved process for the production of titanium dioxide by the hydrolysis of acid solutions of titanium salts at comparatively low temperatures. Such acid solutions are obtained by the proper chemical treatment of titanium bearing ores with sulphuric or hydrochloric acids.

In those processes which have been previously described the hydrolysis depends upon the introduction in one form or another of colloidal nuclei to initiate crystallization. Especially is this true in the case of concentrated solutions of high viscosity or high acidity in which the formation of nuclei would otherwise take place at an exceedingly slow rate.

It is well known that the formation of titanium hydrate takes place very readily upon merely diluting sufficiently with water a hot solution of a titanium salt, but the particles so formed tend to be very granular, very coarse and to occlude large quantities of impurities such as salts of iron.

Furthermore, in those methods in which nuclei are introduced by addition of a previously precipitated titanium hydrate the size of the particles tends to increase progressively throughout the period of hydrolysis because the crystals already formed are built up both by molecular addition and by adhesion. Such precipitates settle readily but are not satisfactory for the production of a pure pigment, since they lack opacity and must be subsequently treated to reduce them to the correct degree of dispersion.

The present invention has for its object the production of titanium dioxide of crystalline form, of small particle size and substantially free from impurities.

We have discovered that if a concentrated solution of an acid titanium salt is slowly added to a dilute solution of a protective colloid, crystallization of titanium dioxide takes place immediately, and the formation of large aggregates of the dioxide is entirely inhibited by the protection afforded by a colloidal film with which each particle of dioxide becomes immediately encased, provided, of course, that there is a sufficient amount of the protective colloid present in the solution to cover all of the large and increasing interfacial surfaces presented by the particles of the dioxide produced as the hydrolysis proceeds. Furthermore, there should be a sufficient excess of the protective colloid present in the solution so that, at the temperature selected for hydrolysis, the progressive hydrolysis of the colloid shall not reduce its concentration below the optimum concentration required by the particle surface of the dioxide.

While various complex organic molecules might serve in this protective capacity, few possess the necessary characteristic of being readily removable from the precipitate.

We have discovered that complex polysaccharides which result from partial hydrolysis of the starches possess all the desirable protective characteristics and at the same time are readily converted to soluble sugars by the acid medium in which the hydrolysis takes place and hence can be readily removed. It is sufficient merely to cause the hydrolysis to take place at a temperature below the boiling point of the solution, say 80° C., and, after all the titanium salt has been added to the colloid solution, to maintain the solution containing the precipitate at the boiling point for a short period of time, which period will depend on the amount of excess of the protective colloid which has been added. This is all that is necessary for the conversion of the gelatinous polysaccharide into soluble dextrose which can be readily removed from the dioxide particles by washing.

In order to describe our invention more clearly the following specific examples are given;

*Example 1.*—Two volumes of titanium sulphate solution containing 100 to 200 grams of titanium dioxide per litre are slowly and continuously added over a period of about one hour to three volumes of water containing 0.5% of dextrine by weight maintained under agitation at a temperature of approximately 80° C. While these percentages or proportions give a very high yield and a product of excellent quality they may be varied within wide limits depending upon the nature of ore treated, the amount of free acid in the titanium sulphate solution, the concentration of the titanium sulphate, and the temperature chosen for hydrolysis.

As soon as all the titanium sulphate has been run into the hydrolyzing bath so prepared, the latter is raised to the boiling point and maintained thereat until the dextrine has been completely converted to sugar. The solution may then be further diluted by the addition of water to reduce the viscosity of the solution so that the rate of settling in the first wash waters is accelerated.

*Example 2.*—Two volumes of titanium sulphate solution heated to approximately 80° C. and containing 100 to 200 grams of titanium dioxide per liter and two volumes of a solution containing 0.75% of dextrine heated approximately to 90° C. are simultaneously added with agitation to one volume of water maintained at a temperature of approximately 90° C., the rate of addition of the two solutions being so adjusted that there is always present in the vat in which the hydrolysis takes place an excess of the dextrine solution, the two solutions being run down in approximately one hour. When the addition of the two solutions to the water is complete, the whole is raised to the boiling point and maintained thereat until the dextrine has been completely converted into sugar. The precipitate is then washed until the sugar and undesirable impurities have been eliminated.

In the practice of the process the concentration of the polysaccharide solution is preferably somewhat less than one per cent, and the total amount of the polysaccharide should be somewhat less than 10% of the amount of titanium dioxide contained in the solution to be hydrolyzed. The concentration of the polysaccharide solution may be much greater than one per cent without materially affecting the result, although such excess will result in a waste of the polysaccharide and will not be economical as regards time, since the hydrolysis of the excess of the polysaccharide will be considerably delayed.

While in the specific examples given the preferable method of procedure is set forth in specific detail in order to afford a definite understanding of the invention, it will be evident to those skilled in the art that certain variations, within limits, of the proportions, concentrations and temperatures may be resorted to without departing from the spirit of the invention, and such variations as fall within the limits of the appended claims are intended to be covered thereby, reference being had to said claims for an exact definition of the invention.

Having thus described the invention, what is claimed is:

1. The method of producing titanium dioxide which consists in diluting with water a solution of a hydrolyzable salt of titanium in the presence of a protective colloid.

2. The method of producing titanium dioxide which consists in diluting with water a solution of a hydrolyzable salt of titanium in the presence of a protective colloid at a temperature of from 60° to 100° C.

3. In a method for the production of titanium dioxide the step which comprises adding an acid solution of a titanium salt to water containing a complex polysaccharide.

4. In a method for the production of titanium dioxide the step which comprises adding an acid solution of a titanium salt to water containing approximately 0.75% by weight of a complex polysaccharide.

5. In a method for the production of titanium dioxide the step which comprises adding an acid solution of a titanium salt to water containing approximately 0.75% by weight of dextrine.

6. In a method for the production of titanium dioxide the step which comprises adding an acid solution of a titanium salt to water containing approximately 0.75% by weight of a complex polysaccharide at a temperature of from 60° to 100° C.

7. In a method for the production of titanium dioxide the step which comprises adding an acid solution of a titanium salt to water containing approximately 0.75% by weight of dextrine at a temperature of from 60° to 100° C.

8. In a method for the production of titanium dioxide the step which comprises adding an acid solution of a titanium salt to water containing approximately 0.75% by weight of a complex polysaccharide at a temperature of from 60° to 100° C. and then maintaining the added solutions at the boiling point to hydroylze the polysaccharide to sugar.

9. In a method for the production of titanium dioxide the step which comprises adding an acid solution of a titanium salt to water containing approximately 0.75% by weight of dextrine at a temperature of from 60° to 100° C. and then maintaining the added solutions at the boiling point to hydrolyze the dextrine to a soluble sugar.

10. In a process for the production of titanium dioxide the steps which consist of adding an acid solution of a titanium salt to water containing approximately 0.75% by weight of a complex polysaccharide at a temperature above 60° and below 100° C., and then raising the temperature of the solution to the boiling point to hydrolyze the polysaccharide.

11. In a process for the production of titanium dioxide the step which consists of adding a concentrated acid solution of titanium salt to water containing approximately 0.75% of dextrine at a temperature above 60° C. and below 100° C. and then raising the temperature of the solution to the boiling point to hydrolyze the dextrine.

12. In a method for the production of titanium dioxide the step which comprises adding an acid solution of a titanium salt to water containing a polysaccharide in quantity sufficient to cover upon crystallization the interfacial surface of the total titanium dioxide contained in the solution to be hydrolyzed.

13. In a method for the production of titanium dioxide the step which comprises adding an acid solution of a titanium salt to water containing a dextrine in quantity sufficient to cover upon crystallization the interfacial surface of the total titanium dioxide contained in the solution to be hydrolyzed.

14. In a method for the production of titanium dioxide the step which comprises adding an acid solution of a titanium salt to water containing a polysaccharide in quantity sufficient to cover upon crystallization the interfacial surface of the total titanium dioxide contained in the solution to be hydrolyzed at a temperature of from 60° to 100° C.

15. In a method for the production of titanium dioxide the step which comprises adding an acid solution of a titanium salt to water containing dextrine in quantity sufficient to cover upon crystallization the interfacial surface of the total titanium dioxide contained in the solution to be hydrolyzed at a temperature of from 60° to 100° C.

16. In a method for the production of titanium dioxide the step which comprises adding an acid solution of a titanium salt to water containing a polysaccharide in quantity sufficient to cover upon crystallization the interfacial surface of the total titanium dioxide contained in the solution to be hydrolyzed at a temperature of from 60° to 100° C., and then maintaining the added solutions at the boiling point to hydrolyze the polysaccharide.

17. In a method for the production of titanium dioxide the step which comprises adding an acid solution of a titanium salt to water containing dextrine in quantity sufficient to cover upon crystallization the interfacial surface of the total titanium dioxide contained in the solution to be hydrolyzed at a temperature of from 60° C. to 100° C., and then maintaining the added solutions at the boiling point to hydrolyze the dextrine.

18. In a method of producing titanium dioxide the step which comprises simultaneously adding an acid solution of a titanium salt and a solution containing a complex polysaccharide to a volume of water.

19. In a method of producing titanium dioxide the step which comprises simultaneously adding an acid solution of a titanium salt and a solution containing dextrine to a volume of water.

20. In a method of producing titanium dioxide the step which comprises simultaneously adding an acid solution of a titanium salt heated to approximately 80° C. and a solution containing a complex polysaccharide heated to approximately 90° C. to a volume of water.

21. In a method of producing titanium dioxide the step which comprises simultaneously adding an acid solution of a titanium salt heated to approximately 80° C. and a solution containing dextrine heated to approximately 90° C. to a volume of water.

22. In a method of producing titanium dioxide the step which comprises simultaneously adding an acid solution of a titanium salt heated to approximately 80° C. and a solution containing a complex polysaccharide heated to approximately 90° C. to a volume of water maintained at approximately 90° C.

23. In a method of producing titanium dioxide the step which comprises simultaneously adding an acid solution of a titanium salt heated to approximately 80° C. and a solution containing dextrine heated to approximately 90° C. to a volume of water maintained at approximately 90° C.

24. In a method of producing titanium dioxide the step which comprises simultaneously adding an acid solution of a titanium salt and a solution containing a complex polysaccharide to a volume of water, the two solutions being respectively added at a rate to maintain an excess of the polysaccharide in said volume of water.

25. In a method of producing titanium dioxide the step which comprises simultaneously adding an acid solution of a titanium salt and a solution containing dextrine to a volume of water, the two solutions being respectively added at a rate to maintain an excess of the dextrine in said volume of water.

26. In a method of producing titanium dioxide the step which comprises simultaneously adding an acid solution of a titanium salt and a solution containing a complex polysaccharide to a volume of water, and then boiling the combined solutions and water.

27. In a method of producing titanium dioxide the step which comprises simultaneously adding an acid solution of a titanium salt and a solution containing dextrine to a volume of water, and then boiling the combined solutions and water.

28. In a method of producing titanium dioxide the step which comprises simultaneously adding an acid solution of a titanium salt heated to approximately 80° C. and a solution containing a complex polysaccharide heated to approximately 90° C. to a volume of water, and then boiling the combined solutions and water.

29. In a method of producing titanium dioxide the step which comprises simultaneously adding an acid solution of a titanium salt heated to approximately 80° C. and a solution containing dextrine heated to approximately 90° C. to a volume of water, and then boiling the combined solutions and water.

30. In a method of producing titanium dioxide the step which comprises simultaneously adding an acid solution of a titanium salt heated to approximately 80° C. and a solution containing a complex polysaccharide heated to approximately 90° C. to a volume of water maintained at approximately 90° C., and then boiling the combined solutions and water.

31. In a method of producing titanium dioxide the step which comprises simultaneously adding an acid solution of a titanium salt heated to approximately 80° C. and a solution containing dextrine heated to approximately 90° C. to a volume of water maintained at approximately 90° C., and then boiling the combined solutions and water.

32. In a method of producing titanium dioxide the step which comprises simultaneously adding an acid solution of a titanium salt and a solution containing a complex polysaccharide to a volume of water, the two solutions being respectively added at a rate to maintain an excess of the polysaccharide in said volume of water, and then boiling the combined solutions and water.

33. In a method of producing titanium dioxide the step which comprises simultaneously adding an acid solution of a titanium salt and a solution containing dextrine to a volume of water, the two solutions being respectively added at a rate to maintain an excess of the dextrine in said volume of water, and then boiling the combined solutions and water.

34. In a method of producing titanium dioxide the step which comprises simultaneously adding an acid solution of a titanium salt heated to approximately 80° C. and a solution containing a complex polysaccharide heated to approximately 90° C. to a body of water maintained at a temperature of approximately 90° C., and then boiling the combined solutions and water.

35. In a method of producing titanium dioxide the step which comprises adding two volumes of a titanium sulphate solution containing 100 to 200 grams of titanium dioxide per liter and two volumes of a solution containing approximately 0.75% of dextrine to one volume of water under agitation, the two solutions being added at a rate to constantly maintain an excess of the dextrine solution.

36. In a method of producing titanium dioxide the step which comprises adding two volumes of titanium sulphate solution containing 100 to 200 grams of titanium dioxide per liter and two volumes of a solution containing approximately 0.75% of dextrine to one volume of water under agitation, the two solutions being added at a rate to constantly maintain an excess of the dextrine solution, and then converting the dextrine into sugar by boiling.

37. In a method of producing titanium dioxide the step which comprises adding two volumes of titanium sulphate solution containing 100 to 200 grams of titanium dioxide per liter and two volumes of a solution containing approximately 0.75% of a complex polysaccharide to one volume of water under agitation, the two solutions being added at a rate to constantly maintain an excess of the polysaccharide.

38. In a method of producing titanium dioxide the step which comprises adding two volumes of titanium sulphate solution containing 100 to 200 grams of titanium dioxide per liter and two volumes of a solution containing approximately 0.75% of a complex polysaccharide to one volume of water under agitation, the two solutions being added at a rate to constantly maintain an excess of the polysaccharide, and then converting the polysaccharide into sugar by boiling.

REGINALD HILL MONK.
ARCHIBALD STEWART ROSS.